A. O. BUCKIUS, Jr.
CLEVIS.
APPLICATION FILED MAR. 22, 1917.

1,287,869.

Patented Dec. 17, 1918.

Inventor
Albert O. Buckius Jr.
By his Attorney
Clarence D. Kerr

UNITED STATES PATENT OFFICE.

ALBERT O. BUCKIUS, JR., OF CHICAGO, ILLINOIS, ASSIGNOR TO THE NATIONAL MALLE-ABLE CASTINGS COMPANY, OF CLEVELAND, OHIO, A CORPORATION OF OHIO.

CLEVIS.

1,287,869.　　　　Specification of Letters Patent.　　Patented Dec. 17, 1918.

Application filed March 22, 1917.　Serial No. 156,561.

*To all whom it may concern:*

Be it known that I, ALBERT O. BUCKIUS, Jr., a citizen of the United States, residing at Chicago, Cook county, Illinois, have invented new and useful Improvements in Clevises, of which the following is a specification, reference being had to the accompanying drawings, in which—

Figure 1:
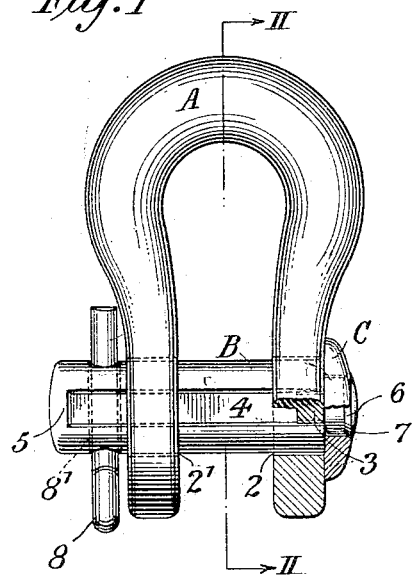
Figure 2:
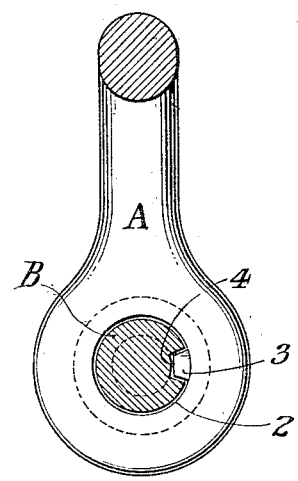
Figure 3:
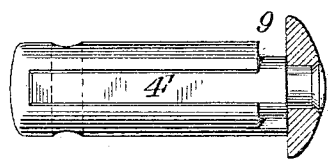
Figure 4:
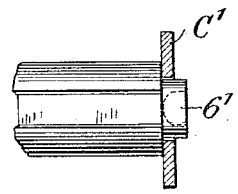
Figure 5:
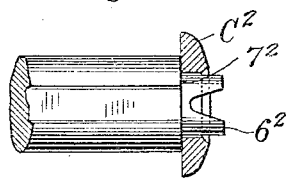

Figure 1 shows my improved clevis in elevation, partly in section; Fig. 2 is a section on lines II—II of Fig. 1; Fig. 3 shows a modified form of the pin for the clevis, the pin being made in a form that does not readily permit it to work through the holes in the clevis, even though the cotter pin is lost, and Figs. 4 and 5 show further modifications of the pin.

My invention relates to clevises such as are ordinarily used for railway appliances, such as car couplers, and consists particularly in forming the clevis and the pin therefor so that the device is easy to manufacture and, when applied, is efficient in service. My invention also consists in the construction and coöperation of the parts which I shall hereinafter describe and claim.

Referring to the drawings, A indicates the clevis, B the pin therefor and C a separate head for the pin B. Formed integrally with the clevis and extending into the eye 2 thereof is a projection 3. The pin B has a longitudinal groove or slot 4, which is closed at one end 5 of the pin and open at the other end, adjacent the reduced portion 6. The pin is applied to the clevis from the left, first being inserted into the clevis eye 2′, and then into the eye 2, with the projection 3 entering the groove 4. The head C is then placed upon the pin and the end 6 riveted over, so as to hold the head against the shoulder 7 on the pin, thereby securing the head C firmly between the shoulder 7 and the upset end 6 of the pin B.

When the pin B has been so applied to the clevis A and the head has been riveted in position, the pin can then be withdrawn to the right only as far as is allowed by the projection 3 and the closed end 5 of the groove. This retraction is sufficient to enable a link or other member to be withdrawn from the bight of the clevis, but the bearing of the projection 3 against the closed end 5 of the groove 4 prevents the disengagement of the pin from the clevis, so that it cannot become separated therefrom and lost. When a link or other member has been inserted into the clevis, the pin may be held in operative position closing the clevis by a cotter 8, which is inserted through a slot 8′ near the end 5 of the pin.

In Fig. 3, I have shown a modified form of pin, in which the slot 4′ has a right-angled portion 9, so that, when the pin has been applied and is in operative position, the pin may be turned so as to bring the projection 3 into the groove 9, which will help to hold the pin in operative position without the use of a cotter.

In Fig. 4, I have shown the head replaced by an ordinary washer C′ and with the reduced portion of the pin 6′ hollowed out at the end, in order to facilitate the riveting operation.

In Fig. 5, I have shown a further modification, in which the end $6^2$ is notched and forms two bendable lugs which may be bent over upon the head $C^2$, and thereby secure it against the shoulder $7^2$ of the pin.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:—

1. A clevis having a pin arranged to slide endwise through apertures therein, said pin having a longitudinal groove, a projection in the eye of the clevis coöperating with said groove, a separate head adapted to be secured to one end of the pin to prevent removal of the pin from the clevis in one direction, and a stop at the opposite end of said groove permitting longitudinal movement of the pin for operation of the clevis but preventing the complete disengagement of the pin from the clevis.

2. A clevis having alined eyes, a pin arranged to slide endwise through such eyes said pin having a reduced end, a head adapted to be placed upon said reduced end, said reduced end being adapted to be upset to hold such head in position after the pin has been inserted in the clevis, and means for preventing the disengagement of the pin from the clevis.

ALBERT O. BUCKIUS, Jr.

Copies of this patent may be obtained for five cents each, by addressing the "Commissioner of Patents, Washington, D. C."